C. McD. ANKENY.
RESILIENT WHEEL.
APPLICATION FILED MAY 31, 1916.
1,217,385.
Patented Feb. 27, 1917.
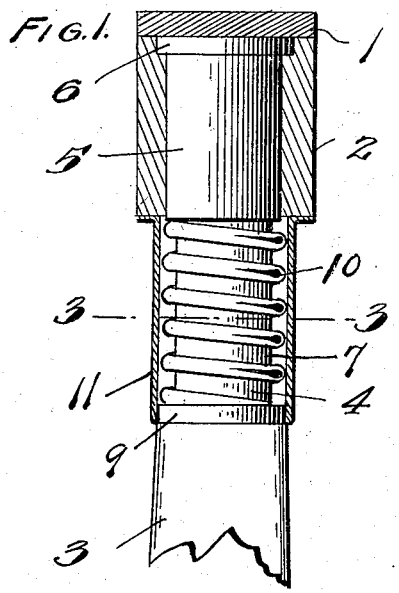
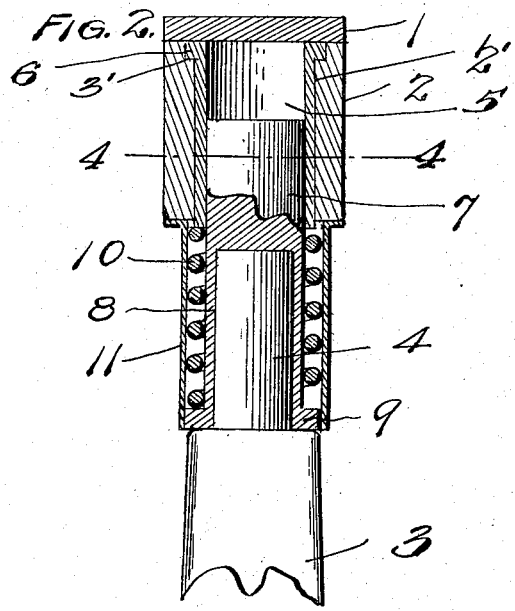
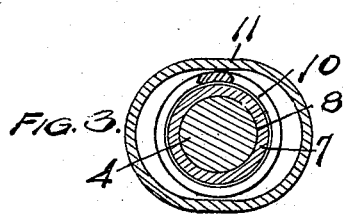
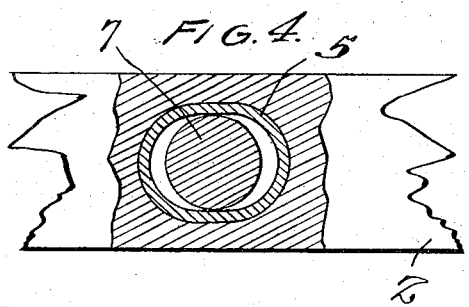
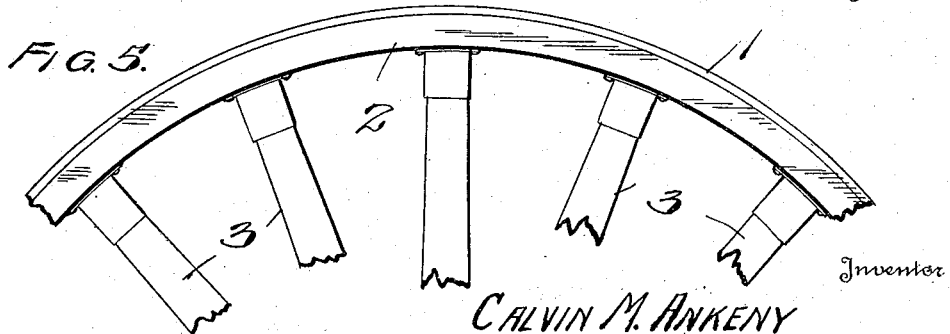
Inventor
CALVIN M. ANKENY
By Herman A. Phillips
Attorney

UNITED STATES PATENT OFFICE.

CALVIN McDOWELL ANKENY, OF SOMERSET, PENNSYLVANIA.

RESILIENT WHEEL.

1,217,385.

Specification of Letters Patent.

Patented Feb. 27, 1917.

Application filed May 31, 1916. Serial No. 100,851.

*To all whom it may concern:*

Be it known that I, CALVIN M. ANKENY, a citizen of the United States of America, residing at Somerset, in the county of Somerset and State of Pennsylvania, have invented new and useful Improvements in Resilient Wheels, of which the following is a specification.

My present invention relates to an improved resilient wheel, and the invention is designed for the purpose of providing a wheel of this character which is simple in construction, durable, and comparatively inexpensive in production.

The invention consists in certain novel combinations and arrangements of spring-pressed parts between the tire and felly of the wheel, in conjunction with the outer end of the spoke of the wheel, as will be more fully hereinafter described and claimed.

In the accompanying drawings I have illustrated one complete example of the physical embodiment of my invention constructed according to the best mode I have so far devised for the practical application of the principles of my invention.

Figure 1 is a view showing the tire felly and a shield or protective sleeve in cross section, while the novel features of my invention are shown in elevation in connection with the end of a spoke.

Fig. 2 is a similar view to Fig. 1, but in section.

Fig. 3 is a sectional view on line 3—3 of Fig. 1.

Fig. 4 is a sectional view at line 4—4, Fig. 2.

Fig. 5 is a side elevation of a portion of a wheel having my invention adapted thereto, showing the outer ends of spokes and the tire and felly.

In the physical embodiment of my invention I have utilized a wheel of the buggy or carriage type which includes the usual metallic ring or tire 1, the wooden felly 2, and the spokes 3 with their reduced outer ends or extensions 4. In converting a wheel of the buggy type for use in my invention, I employ an opening 2' in the felly which takes the place of the usual socket in which the end of the spoke is fitted in the ordinary construction. The outer end of the opening 2' is countersunk at 3' so that this countersunk socket is adapted to receive the metallic bushing 5 and its annular flange 6. It will readily be seen that the bushing may be entered into the socket from the outer periphery of the felly before the tire 1 is placed upon the felly, and the flange 6 is seated in the countersunk or counterbored portion 3' of the socket. The tire 1, when in position, of course prevents the bushing from being displaced outwardly through the socket.

In connection with the bushing I employ an elongated ferrule 7 which is bored out to form a socket at 8, and is provided with an annular flange 9. The solid end of the ferrule is located in the bushing 5 and is movable therein. Between the flange 9 of the ferrule and the inner end of the bushing 5, a spring 10 is located which is coiled about the ferrule and bears against the respective bushing and flanged ferrule. The socket 8 of the ferrule, it will be apparent, is designed to receive the reduced end 4 of the spoke 3, and the spoke bears against the inner end of the ferrule at the annular flange 9. The whole of the exposed parts of the invention are inclosed within a shield or casing 11 which is a cylindrical metallic tube fixed to the inner periphery of the felly and projecting down and inclosing the annular flange 9 of the ferrule.

In assembling the parts, it will be understood, that the resilient connection between the felly and the spoke is accomplished by compressing the spring 10. Thus, when each spring of all the spokes is under compression between the respective flanges 9 and the inner ends of the bushing 5, it will be apparent that all of the spokes are resiliently connected with the felly, and that the weight of the load upon the wheel is resiliently supported, so that shocks or jars will be absorbed and prevented from doing injury to the vehicle.

A shock or jar is taken up by the spring 10 of the spoke when the load is transmitted through the spoke and ferrule to the spring by way of the flange 9 of the ferrule. The movement of the ferrule, of course, causes its solid end to slide through the socket or bushing 5 toward the metallic tire 1, and in this way the shock is absorbed. The fact that all of the springs on the spokes are under compression even when the load is not great, renders the wheel to a certain extent rigid, and prevents excessive vibration. The rigidity of the wheel, however, may be governed by the compression of the springs under normal conditions, and also by the tensile strength of the springs. However, it is my intention to adapt the springs to the wheels, and adapt the wheels to vehicles carrying loads under varying conditions.

From the above description taken in connection with my drawings it is apparent that I have provided a resilient wheel which fulfils the conditions set forth as being the object of my invention, and it will be noted that when the wheel is equipped with my invention, as partly illustrated in Fig. 5, the appearance of the wheel is but slightly changed, but its efficiency is very greatly increased.

What I claim is:

The combination with a felly having a socket and a bushing seated therein and a tire on the felly to retain the bushing, of a spoke with a reduced end, a flanged ferrule fitted over said end and projecting in the bushing, a spring between the flanged end of the ferrule and the inner end of the bushing, and a sleeve on the ferrule inclosing said spring.

In testimony whereof I affix my signature.

CALVIN McDOWELL ANKENY.

Copies of this patent may be obtained for five cents each, by addressing the "Commissioner of Patents, Washington, D. C."